Nov. 23, 1943.                G. F. EGLINTON                2,334,755
CUTTING TOOL
Filed Dec. 18, 1939
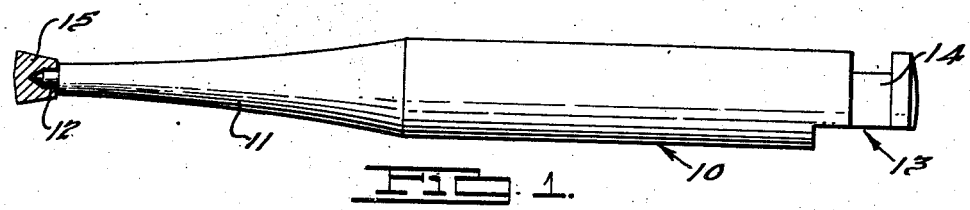
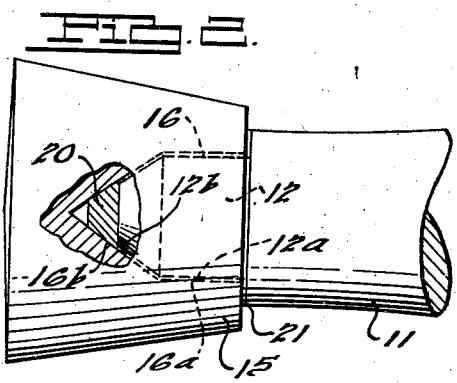
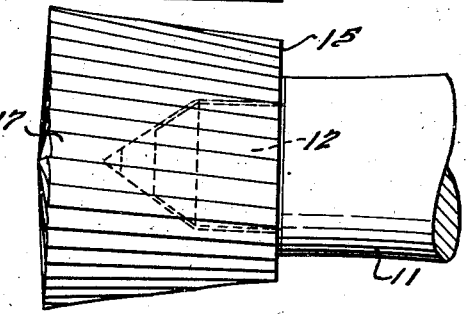
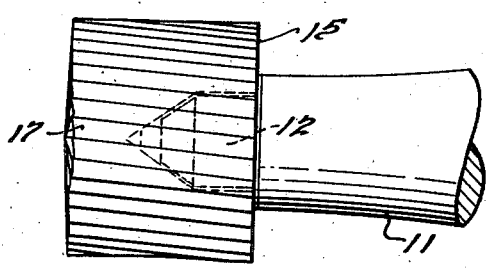
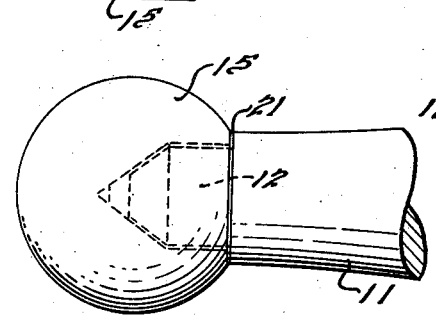
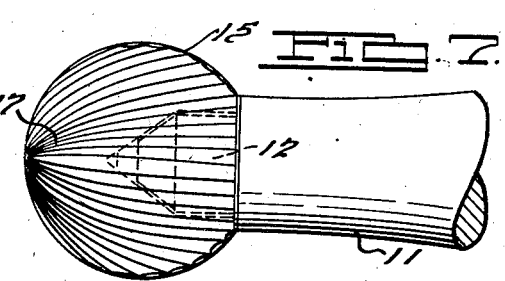
INVENTOR
George F. Eglinton
BY Dike, Calver & Gray
ATTORNEYS.

Patented Nov. 23, 1943

2,334,755

UNITED STATES PATENT OFFICE 2,334,755

CUTTING TOOL

George F. Eglinton, Detroit, Mich., assignor to Carbur, Inc., Lincoln Park, Mich., a corporation of Michigan Application December 18, 1939, Serial No. 309,738

2 Claims. (Cl. 32—59)

The present invention relates to improvements in a cutting tool or instrument such for example as a dental burr, and to an improved method for making the same. Particularly, the invention relates to a two part cutting tool in which the cutting element is formed of a hard but relatively brittle refractory metal which is secured to a shank formed of a relatively softer but less brittle metal.

It is a principal object of the present invention to provide a cutting tool or instrument such as a dental burr which is provided with a hard cutting head formed of refractory metal and in which the cutting edges or grooves therein are so formed as to render unnecessary the use of a separate grinding instrument to penetrate the enamel and dentine of a tooth and which is generally more convenient and effective than conventional types of dental burrs formed of tool steel or comparable materials.

It is another object of the invention to provide an article of the foregoing character as well as a method for making it, in which a cutting head of hard refractory metal may be formed from an initially produced compact of sintered powdered metals, and which is provided with accurately formed cutting teeth cut in the sintered metal blank, and in which the relatively brittle refractory metal head is secured to and reinforced by a portion of the less brittle but softer shank.

It is still another object of the invention to provide an article of the above specified class which is relatively long-lived and effective in operation and which may be successfully manufactured according to a commercially feasible method for making the same.

Other objects and advantages of this invention will appear in the following description and appended claims, reference being had to the accompanying drawing forming a part of this specification wherein like reference characters designate corresponding parts in the several views.

Fig. 1 is a side elevation partially in section of one embodiment of the present invention.

Fig. 2 is an enlarged side elevational view of the head and immediately adjacent parts of the form of the invention shown in Fig. 1. In Fig. 2 the head is shown prior to the formation of cutting teeth therein and in Fig. 3 it is shown after the formation of the cutting teeth. Figs. 1 to 3 show a form of tool referred to as the inverted cone type head.

Figs. 4 and 5 are similar to Figs. 2 and 3 except that a cylindrical type head is shown.

Fig. 4 shows this head before the formation of cutting teeth therein and Fig. 5 after the formation thereof.

Figs. 6 and 7 are also similar to Figs. 2 and 3 respectively except that a round or spherical type head is shown.

Before explaining in detail the present invention it is to be understood that the invention is not limited in its application to the details of construction and arrangement of parts illustrated in the accompanying drawing, since the invention is capable of other embodiments and of being practiced or carried out in various ways Also it is to be understood that the phraseology or terminology employed herein is for the purpose of description and not of limitation, and it is not intended to limit the invention claimed herein beyond the requirements of the prior art.

In the drawing there is illustrated by way of example one embodiment of the present invention, namely, a dental drill or burr. It will be understood, however, that the invention may be embodied in other cutting tools or instruments of the same general character. The numeral 10 represents in general the body portion of the instrument. This body is provided with a shank 11 having a reduced end or projection 12 extending therefrom. The reduced end or projection 12 is so dimensioned as to provide an annular shoulder 21 which is adapted to abut against the end of the refractory metal head 15 and provide a support therefor. This provision of the reduced end or projection 12 also permits its attachment to the head 15 without unduly weakening the internal structure thereof. The end of the body 10 oppositely disposed from the shank 11 constitutes a butt or part suitably engageable by a drill holder or other supporting and motivating means. To further this function this butt end of the body 10 may be provided with suitable slots and grooves such as those indicated at 13 and 14. It will be understood, of course, that any suitable construction of the body portion 10 may be utilized depending upon the device in which the instrument is to be inserted or with which it is to operate.

The numeral 15 represents the cutting head in the present cutting tool instrument. This head is formed with a recess indicated at 16 extending into the interior thereof which recess is sized and positioned to accommodate the projection 12 on the shank 11 of the body portion of the device. The head 15 is initially separately formed from the body 10 and is connected thereto by insertion of the projection 12 into the recess 16 and firmly securing the head on the shank by suitable means such as by brazing or the like.

As here shown, the recess 16 is provided with a cylindrical body portion 16a which terminates in a conical end portion 16b. This shape of recess is preferred as it permits ready manufacture of the refractory metal blank by conventional pressing and sintering operations. The shape of the recess 16 herein disclosed also serves to distribute the stresses throughout the entire blank both during its manufacture and during the use of the tool. The projection 12 is provided with a cylindrical body portion 12a and a truncated conical end portion 12b which are so dimensioned that when placed in the recess 16, a space for brazing metal is provided between the head 15 and the projection 12. By this construction the parts may be accurately positioned and a suitable mass of brazing material 20 disposed between the cylindrical portion 12a of the projection 12 and the corresponding cylindrical portion 16a of the recess 16 by placing a pellet of brazing material in the 16 by placing a pellet of brazing material in the conical end portion 16b and then inserting the end portion 12b into the recess. The entire assembly is then placed in the furnace and the pellet of brazing material is melted and flows into the spaces between the recess 16 and the projecting end portion 12b. All brazing material not required to braze the parts is retained in the end 16b and occupies the space between the end of the truncated conical portion 12b of the projection 12 and the end of the conical end 16b of the recess 16. This construction has been found to be very desirable in a tool of this type since the provision of the brazing material at these points provides a relatively soft metal cushion between the tool steel of the shank 11 and the hard brittle metal of the end 15.

The head 15 may be of any suitable size and shape. For example, it may be the substantially inverted cone shown in Figs. 2 and 3, or it may be generally cylindrical in shape as shown in Figs. 4 and 5, or spherical as shown in Figs. 6 and 7, or it may be oval, pear-shaped or the like depending upon its contemplated use and the purpose to which it is desired to be put. It will be understood that the desired shape can be readily determined and suitable changes in shape can easily be made by a competent mechanic skilled in the art.

The head 15 is formed from a relatively hard refractory metal. For instance, it may be formed of tungsten or tantalum carbide or other hard metallic carbides or alloys of a similar nature and in particular the tungsten carbide material such as is supplied under the trade name "Carboloy." The head 15 is initially formed separately from the body 10 and is formed by a pressing and sintering operation as a result of which it is provided with a substantially smooth exterior surface as shown in Figs. 2, 4 and 6 and with the conical ended recess 16. Thereafter the flutes indicated at 17 are formed in the surface of the material forming the head and the cutting teeth are formed in the tool. The teeth as formed may be positioned and shaped as desired but preferably are uniformly spaced throughout the entire circumference of the head 15. These flutes may be formed prior to joining the head with the shank or may be formed thereafter but preferably are formed after uniting the head and the shank. These flutes are cut in the refractory metal blank after it has been sintered and are therefore accurately positioned and formed to provide uniform sharp cutting teeth in the portions of the blank which remain between the grooves.

It will be especially noted that in the present invention the cutting teeth thus formed after the sintering operation has been completed are much more accurately cut and more uniformly placed on the tool than where such cutting teeth are formed by grooves cut in an unsintered head which is thereafter sintered. The present method provides a superior tool to that produced by prior known methods because the grooves are accurately positioned in the hard metal blank and form sharp cutting teeth in the blank. Also it is to be noted that the union of the head 15 and the shank 11 is such that the head 15 is positively located and centered on the projecting end 12 of the shank in such a manner as to reinforce the interior of the head 15 and thus avoids breaking and shattering of the head. Also the provision of the annular shoulder 21 provides additional contact area for the brazing metal to contact and at the same time provides additional support for the brittle refractory metal head 15.

I claim:

1. A rotary cutting tool comprising a cutting head formed of a hard but relatively brittle sintered refractory metal, and having a plurality of fluted cutting teeth on the exterior surface thereof, a recess formed in the interior thereof and comprising a generally cylindrical portion leading to and terminating in a substantially conical chamber, a steel shank having a generally cylindrical reduced end terminating in a frustro-conical portion inserted in the recessed interior of said head and in spaced relation to the walls thereof, and an annular shoulder on said shank adjacent the cylindrical portion of the said reduced end thereof, said shoulder extending radially outward from said reduced portion toward the periphery of the base portion of said head and having a top surface portion parallel to the adjacent surface of the base portion of the head to provide a support therefor, and a metal cushion formed of a metal relatively softer than the metal forming said head and said shank, and uniting the reduced end and shoulder of said shank, with the recessed portion and base of said head respectively.

2. A rotary burr comprising a hard sintered metal carbide cutting head, fluted cutting teeth thereon, a shank, means for connecting said shank and said head and comprising a recess in said head for receiving an end of said shank in spaced relation thereto, an annular shoulder on said shank adjacent the end thereof inserted in said recess and extending radially outwardly substantially at right angles to the axis of said shaft, and a cushioning layer of a relatively soft metal interposed between and secured to the adjacent surfaces of said head and the end and shoulder of said shank.

GEORGE F. EGLINTON.